United States Patent Office 3,652,700
Patented Mar. 28, 1972

3,652,700
PROCESS FOR DISPROPORTIONATION OF METHYLBENZENES
Takashi Suzuki and Hiroyuki Iesaka, Niigata, Japan, assignors to Japan Gas-Chemical Company, Inc., Tokyo, Japan
No Drawing. Filed Sept. 4, 1970, Ser. No. 69,935
Claims priority, application Japan, Sept. 9, 1969, 44/70,953
Int. Cl. C07c 3/62
U.S. Cl. 260—672 T
9 Claims

ABSTRACT OF THE DISCLOSURE

The disproportionation of methylbenzenes including toluene and xylenes by use of HF—$BF_3$ catalyst can be accelerated by adding to the reaction system a small amount of hydrocarbon which releases a tertiary carbonium ion under the reaction condition. The reaction becomes possible to be effected at a lower temperature and in a reduced reaction time to obtain benzene or lower methylbenzenes and higher methylbenzenes, preventing the formation of by-products.

---

This invention relates to a method for the disproportionation of methylbenzenes. More particularly, it relates to the disproportionation of methylbenzenes to benzene or lower methylbenzenes and higher methylbenzenes in the presence of a catalyst consisting of hydrogen fluoride and boron trifluoride, characterized in that the disproportionation reaction is effected in the presence of a specific reaction promotor.

Methylbenzenes including toluene each are formed by the thermal cracking or reforming of naphtha, and separated by subjecting the fraction containing the same in the extraction for aromatics followed by distillation or distillation only. However, the proportion of amount of each methylbenzene in a fraction obtained by thermal cracking or reforming of naphtha is in a limited range, and it is considerably difficult from technical and economical view point to produce selectively a specific methylbenzene only. Therefore, it becomes necessary to convert a methylbenzene having a relatively small demand to an aromatic hydrocarbon having a large utility, such as benzene, p-xylene and o-xylene.

The disproportionation of methylbenzenes is one of the methods therefor, and is used, for example, for producing benzene and xylenes from toluene, toluene and trimethylbenzenes from xylenes, or xylenes and tetramethylbenzenes from trimethylbenzenes.

It has been widely known that in the disproportionation of methylbenzenes a catalyst consisting of hydrogen fluoride and boron trifluoride acts as an effective catalyst. However, it can be noted that the disproportionation of methylbenzenes requires a drastic reaction condition, as seen in known processes, owing to difficulty of the transference of methyl group as compared with other alkyl group such as ethyl or isopropyl group. For instance, the condition is at a temperature of 125° C. for 1 hour in the disproportionation of toluene (U.S. Pat. No. 3,006,977), and at a temperature of 132° C. for 25 minutes in that of xylenes (U.S. Pat. No. 2,564,073), even if HF—$BF_3$ catalyst is used. In addition, the use of such high temperature in the disproportionation reaction when using HF—$BF_3$ catalyst, naturally results in the increase of the reaction pressure, and this has been a great obstacle coupled with the increase of the formation of by-products and the corrosion of apparatus in the practice of the process. These drawbacks of the known processes results principally from the small reaction rate in the disproportionation of methylbenzenes.

Earnest efforts have been directed to the study on the disproportionation reaction of methylbenzenes, and as a result it has been found that the disproportionation reaction of methylbenzenes using HF—$BF_3$ catalyst is greatly accelerated by adding a small amount of a specific hydrocarbon to the reaction system, whereby the present invention has been achieved. Namely, it has been discovered that in the disproportionation reaction of methylbenzenes to benzene or lower methylbenzenes and higher methylbenzenes using HF—$BF_3$ catalyst the reaction can be accelerated with suppressing the formation of by-products by adding a hydrocarbon capable of formation of tertiary carbonium ion under an acidic condition.

According to the process of the present invention, the reaction rate of the disproportionation of methylbeneznes is so greatly accelerated that the reaction can be completed at a lower temperature and in a shorter period of time, and thereby it is feasible to make the reactor small and to minimize the formation of by-products. It is also feasible to resolve the corrosion problem of industrial apparatus under the condition of high temperature and high pressure involved in the conventional processes for the disproportionation of methylbenzenes using HF—$BF_3$ catalyst, since the reaction condition is improved so as to be a mild condition.

Methylbenzenes which may be easily subjected to disproportionation by the process of this invention include toluene, o-xylene, p-xylene, m-xylene, pseudocumene, hemimellitene, mesitylene, durene, isodurene, prehnitene, pentamethylbenzene and a mixture thereof. These methylbenzenes may be used either alone or in a mixture in any proportions. Further, a mixture containing the above-mentioned methylbenzenes and non-aromatic hydrocarbons may be used without any obstacles. Thus, a fraction obtained in thermal cracking or reforming of naphtha and containing methylbenzenes and aliphatic hydrocarbons can be used as the starting material of the process of this invention.

The hydrocarbon used as the reaction promotor of the disproportionation in the process of this invention is one capable of formation of a tertiary carbonium ion of the following formula under an acidic condition, as in the presence of sulfuric acid, aluminum chloride, hydrogen fluoride and HF—$BF_3$

wherein $R_1$, $R_2$ and $R_3$ each are same or different and represent an alkyl group.

Such hydrocarbon is divided into the following four groups:

(1) A hydrocarbon represented by the formula

wherein $R_4$ and $R_5$ represent a hydrogen atom or an alkyl group and $R_6$ and $R_7$ represent an alkyl group. The hydrocarbon of this group forms directly the above-mentioned tertiary carbonium ion of Formula I in the presence of an acidic catalyst such as HF-$BF_3$, and includes, for example, isobutylene, 2-methylbutene-1, 2-methylbutene-2, 2,4,4-trimethylpentene-1, 2,4,4-trimethylpentene-2, 2,4,4, 6,6-pentamethylheptene-1 and 2,4,4,6,6-pentamethylheptene-2.

(2) An alkyl-substituted aromatic hydrocarbon represented by the formula

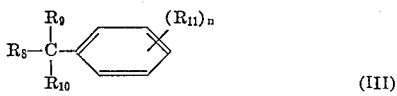
(III)

wherein $R_8$, $R_9$ and $R_{10}$ each are an alkyl group, $R_{11}$ is a hydrogen atom or an alkyl group and $n$ is an integer of 1 to 5. This hydrocarbon decomposes into the tertiary carbonium ion of the Formula I and benzene or substituted benzene under acidic condition as in the presence of HF–BF$_3$ catalyst, and includes, for example, tert.-butylbenzene, tert.-butyltoluene and tert.-butylxylenes.

(3) A hydrocarbon represented by the formula

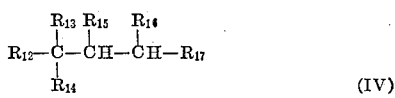
(IV)

wherein $R_{12}$, $R_{13}$, $R_{14}$, $R_{16}$ and $R_{17}$ each are an alkyl group, and $R_{15}$ is a hydrogen atom or an alkyl group. The hydrocarbon of this group decomposes into the tertiary carbonium ion of the Formula I and an aliphatic hydrocarbon under the acidic condition, and includes, for example, 2,2,4-trimethylpentane (isooctane), 2,2,4-trimethylhexane and 2,2,3,4-tetramethylpentane.

(4) A hydrocarbon capable of forming the hydrocarbon of the group (3) as the result of the isomerization under the acidic condition as in the presence of HF–BF$_3$ catalyst. This hydrocarbon includes, for example, an aliphatic hydrocarbon of the formula,

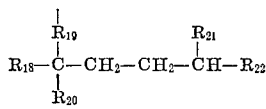

wherein $R_{18}$, $R_{19}$, $R_{20}$, $R_{21}$ and $R_{22}$ each are an alkyl group, such as 2,2,5-trimethylhexane; one of the formula

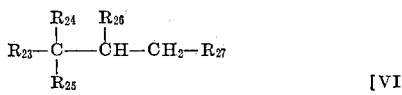
[VI]

wherin $R_{23}$, $R_{24}$, $R_{25}$, $R_{26}$ and $R_{27}$ each are an alkyl group, such as 2,2,3-trimethylpentane; and another of the formula

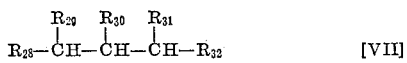
[VII]

wherein $R_{28}$, $R_{29}$, $R_{30}$, $R_{31}$ and $R_{32}$ each are an alkyl group, such as 2,3,4-trimethylpentane.

The amount of the hydrocarbon to be added as the reaction promotor is 0.005 to 0.200 mole, and preferably 0.010 to 0.100 mole, per mole of methylbenzene used. The reaction rate of the disproportionation of methylbenzenes tends to be in proportion to the amount of the promotor. When the amount is less than the lower limit the promotor can not display its sufficient effect, and when it exceeds the upper limit the consumption of the promotor and the increase of by-product occur undesirably.

It will be noted that when a fraction of oils obtained by thermal cracking or reforming of naphtha contains methylbenzenes and the above-mentioned hydrocarbon it may be used as it is as a material in the process of the invention.

The amount of the catalyst consisting of hydrogen fluoride and boron trifluoride is preferably chosen in such a range that the reaction system becomes homogeneous and thereby the promotor may reveal its effect sufficiently. The range is somewhat different between toluene and polymethylbenzene used as the starting material. When toluene is subjected to disproportionation to produce benzene and xylene, the amount of boron trifluoride to be used is 0.10 to 2.00 moles, and preferably 0.80 to 1.50 moles, per mole of toluene, and the amount of hydrogen fluoride to be used is 20 to 3 moles, and preferably 10 to 4 moles, per mole of boron trifluoride, and is 2 to 20 moles, and preferably 3 to 15 moles, per mole of toluene.

When polymethylbenzenes including xylene are subjected to disproportionation to produce lower methylbenzenes and higher methylbenzenes, the amount of boron trifluoride to be used is 0.10 to 1.50 moles, and preferably 0.4 to 1.00 mole per mole of polymethylbenzenes, and the amount of hydrogen fluoride used is 20 to 3 moles, and preferably 10 to 4 moles, per mole of boron trifluoride used, and is 2 to 20 moles, and preferably 3 to 10 moles, per mole of polymethylbenzenes.

The reaction temperature in the process of the present invention is 30° to 150° C., preferably 50° to 110° C., and most preferably 60° to 90° C.

Under the condition above mentioned, methylbenzenes including toluene can be subjected to disproportionation in good conversion in a period of 5 to 20 minutes. The reaction pressure needs to be sufficient to maintain the reaction system in a liquid phase, and is, for example, 25 to 60 kg./cm.$^2$ (gauge) in case of the disproportionation of toluene and 10 to 30 kg./cm.$^2$ (gauge) in case of that of xylenes.

The selectivity of the reaction according to the process of the invention is very good so that in case of the disproportionation of toluene, for example, the formation of trimethylbenzenes is only about 2 percent by mole based on the toluene of starting material when the conversion of toluene is 60 percent. The result shows the superiority of selectivity of the present process as compared with those of the conventional processes, as in U.S. Pat. No. 3,006,977. The selectivity of the disproportionation reaction of methylbenzenes other than toluene is the same as in case of toluene. It is another feature of the invention that since no ethylbenzenes are produced by the process the isolation or purification of products such as xylenes and tetramethylbenzenes become easily feasible without any complicated procedures.

The process of this invention is carried out preferably in an homogeneous phase, and thus the reaction mixture after the completion of the reaction is also in the homogeneous phase in which hydrocarbons, hydrogen fluoride and boron trifluoride are completely dissolved in one another. In order to separate individual hydrocarbons contained therein, it is necessary accordingly to employ a conventional method such as thermal decomposition or extraction. The polymethylbenzene produced by the disproportionation of methylbenzene is a mixture of its isomers, which contains preferentially m-xylene in xylenes, mesitylene in trimethylbenzenes, and isodurene in tetramethylbenzenes. The individual isomers may be separated by known methods.

This invention will be illustrated in more detail by the following examples.

EXAMPLES 1–5 AND COMPARATIVE EXAMPLE 1

Into a 400 ml. autoclave provided with an electromagnetic stirrer, 1.00 mole of toluene and 0.088 mole of isooctane were charged. After cooling the autoclave to 15° C., 6.75 moles of anhydrous hydrogen fluoride was added, and the content of the autoclave was heated to a temperature of 85° C. while stirring vigorously. While maintaining that temperature 1.24 moles of boron trifluoride was blown into the autoclave through a measuring vessel and the reaction was initiated. Ten minutes after the blowing of boron trifluoride, the whole content of the autoclave was withdrawn into ice water and washed with water to remove acids. The reaction product was dried and analyzed by means of gas chromatography. The result is shown in Table 1. In Table 1, there are also shown the results of experiments effected by the same procedures but altering the amount of isooctane as Examples 1 to 3 and Comparative Example 1.

TABLE 1

|  | Example 1 | Example 2 | Example 3 | Comparative Example 1 |
|---|---|---|---|---|
| Material charged (mole): | | | | |
| Toluene | 1.00 | 1.00 | 1.00 | 1.00 |
| Hydrogen fluoride | 6.75 | 6.75 | 6.75 | 6.80 |
| Boron trifluoride | 1.24 | 1.22 | 1.20 | 1.30 |
| Isooctane (promotor) | 0.088 | 0.044 | 0.118 | 0.004 |
| Composition of hydrocarbons in the reaction mixture (mole percent): | | | | |
| Benzene | 38.3 | 33.0 | 18.3 | 4.1 |
| Toluene | 26.7 | 36.1 | 63.2 | 92.0 |
| Xylene | 27.4 | 27.7 | 18.3 | 3.8 |
| Trimethylbenzene | 7.6 | 3.2 | 0.2 | 0.1 |
| Reaction conditions: | | | | |
| Temperature (°C.) | 83 | 82 | 82 | 82 |
| Time (minutes) | 10 | 10 | 10 | 10 |
| Conversion of toluene (percent) | 73.3 | 63.9 | 36.8 | 8.0 |

EXAMPLES 4 AND 5

Toluene was subjected to disproportionation by the procedures same as described in Example 1 under the condition shown in Table 2, and the composition of hydrocarbons in the reaction mixture was determined with the lapse of the reaction time. The results are shown in Table 2.

TABLE 2

|  | Example 4 | | | | | | Example 5 | | | | | |
|---|---|---|---|---|---|---|---|---|---|---|---|---|
| Material charged (mole): | | | | | | | | | | | | |
| Toluene | 1.00 | | | | | | 1.00 | | | | | |
| Hydrogen fluoride | 6.75 | | | | | | 6.75 | | | | | |
| Boron trifluoride | 1.20 | | | | | | 1.20 | | | | | |
| Isooctane (promotor) | 0.018 | | | | | | 0.044 | | | | | |
| Reaction conditions: | | | | | | | | | | | | |
| Temperature (°C.) | 85 | | | | | | 85 | | | | | |
| Time (minute) | 5 | 10 | 15 | 20 | 25 | 40 | 5 | 10 | 15 | 20 | 25 | 30 |
| Composition of hydrocarbons in the reaction mixture (mole percent): | | | | | | | | | | | | |
| Benzene | 13.4 | 20.5 | 23.6 | 27.9 | 28.4 | 31.0 | 22.8 | 33.4 | 34.0 | 36.0 | 33.1 | 35.5 |
| Toluene | 72.5 | 58.3 | 52.1 | 47.5 | 44.3 | 38.0 | 52.6 | 36.1 | 31.8 | 29.5 | 27.2 | 27.0 |
| Xylene | 14.1 | 20.9 | 23.7 | 24.1 | 26.3 | 28.9 | 23.4 | 28.1 | 30.1 | 29.2 | 31.9 | 29.4 |
| Trimethylbenzene |  | 0.3 | 0.6 | 0.5 | 1.0 | 2.1 | 1.2 | 2.4 | 4.1 | 5.3 | 7.8 | 8.1 |
| Conversion of toluene (percent) | 27.5 | 41.7 | 47.9 | 52.5 | 55.7 | 62.0 | 47.4 | 63.9 | 68.2 | 70.5 | 72.8 | 73.0 |

COMPARATIVE EXAMPLE 2

Example 1 was repeated, provided that no reaction promoter was added. The result is shown in Table 3.

TABLE 3

|  | Comparative Example 2 | | | |
|---|---|---|---|---|
| Material charged (mole): | | | | |
| Toluene | 1.00 | | | |
| Hydrogen fluoride | 6.75 | | | |
| Boron trifluoride | 1.20 | | | |
| Promotor | — | | | |
| Reaction conditions: | | | | |
| Temperature (°C.) | 85 | | | |
| Time (min.) | 10 | 30 | 60 | 120 |
| Composition of hydrocarbons in the reaction mixture (mole percent): | | | | |
| Benzene | 0.3 | 1.7 | 4.9 | 11.3 |
| Toluene | 99.4 | 96.5 | 90.3 | 76.0 |
| Xylenes | 0.3 | 1.8 | 4.8 | 12.5 |
| Trimethyl benzenes |  |  |  | 0.2 |
| Conversion of toluene (percent) | 0.6 | 3.5 | 9.7 | 24.0 |

EXAMPLES 6–10

Toluene was subjected to disproportionation by the procedures same as is described in Example 1 under the condition shown in Table 4. In these examples, 2,2,5-trimethylhexane, 2,3,4-trimethylpentane, tert.-butylbenzene, diisobutylene (2,4,4-trimethylpentene) and triisobutylene (2,4,4,6,6-pentamethylheptene) were used as the reaction promotor. The results are shown in Table 4.

TABLE 4

| Example | 6 | 7 | 8 | 9 | 10 |
|---|---|---|---|---|---|
| Material charged (mole): | | | | | |
| Toluene | 1.00 | 1.00 | 1.00 | 1.00 | 1.00 |
| Hydrogen fluoride | 6.75 | 6.75 | 6.75 | 6.75 | 6.75 |
| Boron trifluoride | 1.38 | 1.31 | 1.25 | 1.27 | 1.17 |
| Promotor | [1] 0.039 | [2] 0.044 | [3] 0.037 | [4] 0.045 | [5] 0.030 |
| Reaction conditions: | | | | | |
| Temperature (°C.) | 85 | 85 | 85 | 85 | 87 |
| Time (minutes) | 10 | 10 | 10 | 10 | 10 |
| Composition of hydrocarbons in reaction mixture (mole percent): | | | | | |
| Benzene | 9.4 | 29.5 | 26.4 | 35.7 | 32.6 |
| Toluene | 80.3 | 35.7 | 52.6 | 32.8 | 37.3 |
| Xylenes | 10.0 | 31.5 | 20.5 | 28.0 | 27.1 |
| Trimethyl benzenes | 0.3 | 3.4 | 0.5 | 3.5 | 3.0 |
| Conversion of toluene (percent) | 19.7 | 64.3 | 47.3 | 67.2 | 62.7 |

[1] 2,2,5-trimethylhexane.
[2] 2,3,4-trimethylpentane.
[3] t-Butylbenzene.
[4] Diisobutylene.
[5] Triisobutylene.

COMPARATIVE EXAMPLES 3–6

Toluene was subjected to disproportionation under the condition as shown in Table 5 by the same procedures as in Example 1. In these examples, 2-methylbutane, 2,3-dimethylbutane, 3-methylpentane and n-hexane were used as the reaction promotor. The results are shown in Table 5.

TABLE 5

| Comparative Example | 3 | 4 | 5 | 6 |
|---|---|---|---|---|
| Material charged (mole): | | | | |
| Toluene | 1.00 | 1.00 | 1.00 | 1.00 |
| Hydrogen fluoride | 6.75 | 6.75 | 6.75 | 6.75 |
| Boron trifluoride | 1.33 | 1.24 | 1.21 | 1.40 |
| Promotor | [1] 0.069 | [2] 0.058 | [3] 0.044 | [4] 0.058 |
| Reaction conditions: | | | | |
| Temperature (°C.) | 85 | 85 | 85 | 85 |
| Time (minutes) | 10 | 10 | 10 | 10 |
| Composition of hydrocarbons in reaction mixture (mole percent): | | | | |
| Benzene | 1.7 | 1.9 | 1.7 | 0.8 |
| Toluene | 96.5 | 96.2 | 96.3 | 98.4 |
| Xylenes | 1.8 | 1.9 | 1.9 | 0.8 |
| Trimethylbenzenes |  |  | 0.1 |  |
| Convention of toluene (percent) | 3.5 | 3.8 | 3.7 | 1.6 |

[1] 2-methylbutane.
[2] 2,3-dimethylbutane.
[3] 3-methylpentane.
[4] n-Hexane.

EXAMPLES 11–15

Various methylbenzenes other than toluene were subjected to disproportionation by the same procedures as in Example 1. The methylbenzenes, reaction promotor and reaction condition are shown in Table 6 together with the results.

TABLE 6

| | EXAMPLE | | | | |
|---|---|---|---|---|---|
| | 11 | 12 | 13 | 14 | 15 |
| | m-Xylene | p-Xylene | o-Xylene | 1,2,4-tri-methyl-benzene | 1,3,5-tri-methyl-benzene |
| Material charged (mole): | | | | | |
| Methylbenzene | 1.33 | 1.33 | 1.33 | 1.50 | 1.50 |
| Hydrogen fluoride | 7.00 | 7.00 | 7.00 | 8.00 | 8.00 |
| Boron trifluoride | 0.80 | 0.79 | 0.79 | 1.01 | 1.10 |
| Isooctane | 0.044 | 0.044 | 0.044 | 0.088 | 0.088 |
| Reaction conditions: | | | | | |
| Temperature (° C.) | 82 | 84 | 80 | 82 | 83 |
| Time (minutes) | 10 | 10 | 10 | 10 | 10 |
| Composition of hydrocarbons in reaction mixture (mole percent): | | | | | |
| Benzene | 0.3 | 0.4 | 1.4 | 1.4 | |
| Toluene | 16.7 | 25.6 | 17.3 | 2.9 | 0.7 |
| Xylenes | 69.1 | 50.3 | 64.7 | 18.0 | 7.3 |
| Trimethyl benzenes | 13.9 | 23.7 | 16.6 | 51.4 | 82.9 |
| Tetramethylbenzenes | | | | 26.3 | 9.1 |
| Conversion of methyl benzene percent | 30.9 | 49.7 | 35.3 | 48.6 | 17.1 |

COMPARATIVE EXAMPLES 7 AND 8

1,2,4-trimethylbenzene and 1,3,5-trimethylbenzene were subjected to disproportionation by the same procedure as in Example 1 without any reaction promotor. The results are shown in Table 7 together with the reaction condition.

TABLE 7

| | Comparative Example | |
|---|---|---|
| | 7 | 8 |
| | 1,2,4-trimethyl benzene | 1,3,5-trimethyl benzene |
| Material charged (mole): | | |
| Methyl benzene | 1.50 | 1.50 |
| Hydrogen fluoride | 8.00 | 8.00 |
| Boron trifluoride | 0.98 | 0.92 |
| Reaction conditions: | | |
| Temperature (° C.) | 85 | 85 |
| Time (minutes) | 10 | 10 |
| Composition of hydrocarbons in reaction mixture (mole percent): | | |
| Benzene | 0.1 | |
| Toluene | 1.7 | 0.3 |
| Xylenes | 18.0 | 2.7 |
| Trimethylbenzenes | 60.3 | 93.5 |
| Tetramethylbenzenes | 19.9 | 3.5 |
| Conversion of methyl benzene (percent) | 39.7 | 6.5 |

What is claimed is:

1. A process for the disproportionation of a methylbenzene to benzene or a lower methylbenzene and higher methylbenzene comprising heating methylbenzene at 30° to 150° C. in the presence of a catalyst consisting of hydrogen fluoride and boron trifluoride, and a hydrocarbon capable of formation of a tertiary carbonium ion of the formula

wherein $R_1$, $R_2$ and $R_3$ each represent an alkyl group, under an acidic condition, to promote the reaction.

2. The process according to claim 1, wherein the hydrocarbon is selected from hydrocarbons of the formula

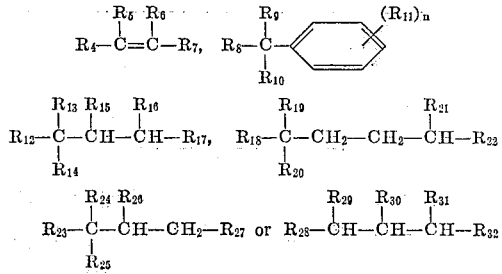

wherein $R_4$, $R_5$, $R_{11}$ and $R_{15}$ each are a hydrogen atom or an alkyl group, $R_6$ to $R_{10}$, $R_{12}$ to $R_{14}$ and $R_{16}$ to $R_{32}$ each are an alkyl group.

3. The process according to claim 2, wherein the hydrocarbon is selected from the group consisting of isobutylene, 2-methylbutene-1, 2-methylbutene-2, 2,4,4-trimethylpentene-1, 2,4,4-trimethylpentene-2, 2,4,4,6,6-pentamethylheptene-1, 2,4,4,6,6-pentamethylheptene-2, tert.-butylbenzene, tert.-butyltoluene, tert.-butylxylene, 2,2,4-trimethylpentane (isooctane), 2,2,4-trimethylhexane, 2,2,3,4-tetramethylpentane, 2,2,5-trimethylhexane, 2,2,3-trimethylpentane and 2,3,4-trimethylpentane.

4. The process according to claim 3, wherein the hydrocarbon is 2,3,4-trimethylpentane, 2,2,5-trimethylhexane, isooctane, tert.-butylbenzene, triisobutylene or isooctene.

5. The process according to claim 1, wherein the hydrocarbon is present in an amount of 0.005 to 0.200 mole per mole of the methylbenzene.

6. The process according to claim 1, wherein the reaction system is a homogeneous phase.

7. The process according to claim 6, wherein the homogeneous system comprises 1 mole of toluene, 0.10 to 2.00 moles of boron trifluoride and 2 to 20 moles of hydrogen fluoride, provided that the mole ratio of boron trifluoride to hydrogen fluoride is 1:20–3.

8. The process according to claim 6, wherein the homogeneous phase comprises 1 mole of polymethylbenzene, 0.10 to 1.50 moles of boron trifluoride and 2 to 20 moles of hydrogen fluoride, provided that the mole ratio of boron trifluoride to hydrogen fluoride is 1:20–3.

9. A process for the disproportionation of toluene to benzene and xylenes comprising heating at 30° to 150° C. a mixture of 1.0 mole of toluene, 0.10 to 2.00 moles of boron trifluoride, 2 to 20 moles of hydrogen fluoride, and 0.005 to 0.200 mole of a hydrocarbon capable of formation of a tertiary carbonium ion of the formula

wherein $R_1$, $R_2$ and $R_3$ each represent an alkyl group, under an acidic condition, the mole ratio of boron trifluoride to hydrogen fluoride being 1:20–3.

References Cited

UNITED STATES PATENTS 2,564,073    8/1951    Lien et al.    260—672 T
3,006,977    10/1961    McCaulay    260—672 T
3,009,004    11/1961    Levy et al.    260—672 T CURTIS R. DAVIS, Primary Examiner